Figure 6:
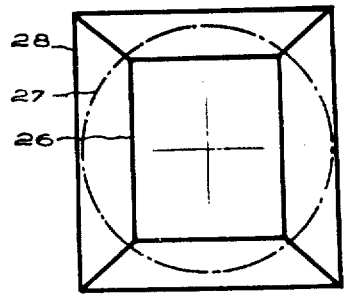

March 7, 1950 M. BONNET 2,499,452
PHOTOGRAPHIC IMAGES OF THE TYPE HAVING
STRIATED REFLECTING BACKS
Filed Dec. 7, 1945 2 Sheets-Sheet 1
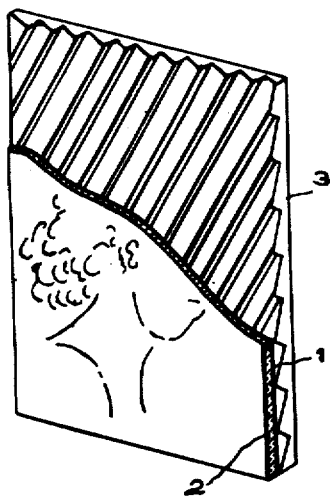
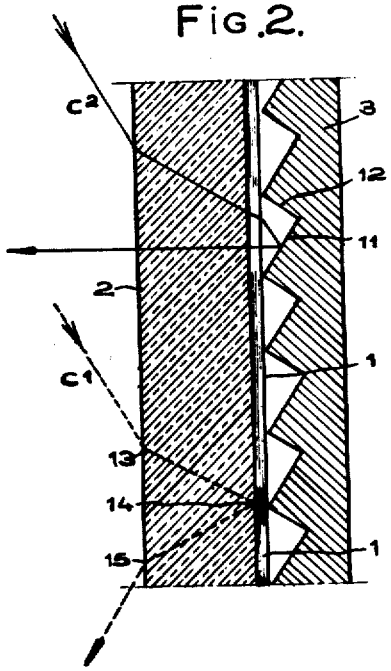
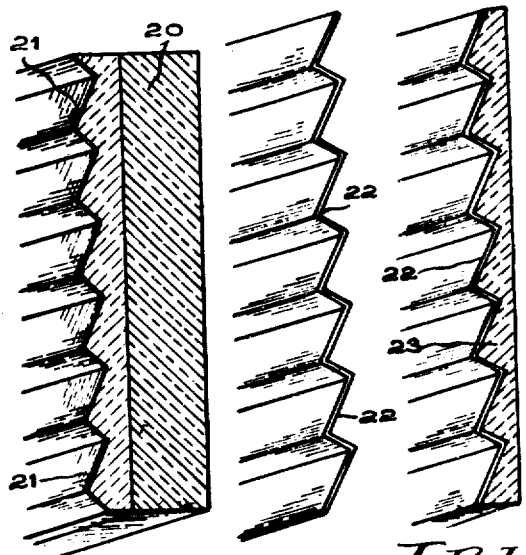
Inventor
M. Bonnet March 7, 1950 — M. BONNET — 2,499,452
PHOTOGRAPHIC IMAGES OF THE TYPE HAVING STRIATED REFLECTING BACKS
Filed Dec. 7, 1945

Inventor
M. Bonnet

UNITED STATES PATENT OFFICE 2,499,452

PHOTOGRAPHIC IMAGES OF THE TYPE HAVING STRIATED REFLECTING BACKS

Maurice Bonnet, Paris, France, assignor to La Reliephographie, Société pour l'Exploitation des Procédés de Photographie en Relief Maurice Bonnet, Paris, France, a French corporation Application December 7, 1945, Serial No. 633,515
In France October 6, 1943

Section 1, Public Law 690, August 8, 1946
Patent expires October 6, 1963

2 Claims. (Cl. 88—1)

In French Patent No. 852,964, dated October 24, 1938, I have, in particular, described and illustrated means intended to be used for obtaining peri-stereoscopic pictures or photographs, said means being intended to improve the reflection conditions, through the back of the photograph, of the light which strikes the latter. For that purpose, I have proposed to form in the rear face of the image projections or facets such as flutes of triangular cross section with equal or unequal sides, said flutes being so set as to be perpendicular to the main direction of admission of the light.

Now, my work and experiments have led to the discovery that said means could advantageously apply not only to peri-stereoscopy, but also to simple, monochromatic or polychromatic photography, and in general to all photographic or photomechanical images observable by reflection.

The present invention has for its object various embodiments and improvements for the utilisation of the back coating forming reflection intensifier, in accordance with the above-mentioned invention; said improvements concerning both the application to simple photographs and the application to peristereoscopic images.

My invention particularly relates to processes and devices for obtaining said back coating, as well as to a device for setting and fixing the back coating, against the image, allowing to give in all the cases to the flutes of the reflection intensifying device, relatively to the image, the direction or disposition best suited to the place chosen for placing or locating the photograph.

In order to render more conspicuous the advantage obtained in extending the invention to simple photographs, I recall the following to mind:

When a photograph is looked at (whether it be a simple photograph or a peristereoscopic image), the luminous rays which strike said photograph pass through the gelatine layer which contains the image; they are reflected by the support of said image-layer (support being usually constituted by a paper), and again pass through the gelatine to reach the observer's eyes. It will therefore be understood that the more the supporting back of the image-layer reflects, the more brilliant the photographic image appears, and the more the scale of its values is wide.

In the actual state of the art, it is for instance impossible, owing to the deficiency of the reflecting properties of the supports used for photographic image-layers, to correctly render the value of the brilliant portions of an object. For remedying this inconvenience, it has already been proposed to use, as photograph support, either metallized papers, or even metal sheets. Said reflecting supports indeed increase the values of the image, but solely under certain settings relatively to the light which illuminates them. Moreover, the reflecting surface of the support being parallel to the free surface of the image-layer, troublesome reflections are caused on said free surface, at the very moment when the metal or metallized support acts the best as reflector. For these reasons, the reflecting backs proposed up to now for simple photographs do not satisfy the particular requirements for lighting said photographs, which generally occupy well defined places, and the setting of which is fixed relatively to the luminous sources.

I have specified, in the above-mentioned patent, that the reflections ensured by the back of the photograph must be suitably different from total reflection, such as that produced by a mirror, and that, consequently, said back must remain a diffusing back.

The experiments I have since effected have led to the discovery that said diffusing action could, in certain cases, be ensured by the layer which carries or contains the image itself, this dispensing with the provision, on the back, of particular diffusing means. If the luminous source which lights the photograph is itself diffused (day-light for instance) the additional diffusion ensured by the image-layer is sufficient in practice. On the contrary, in the case of artificial lighting (bare electric lamp for instance) the coating itself must, according to the invention, contribute to the necessary diffusion. My present invention therefore concerns among others, particular means ensuring the diffusion, to the necessary degree, of the light reflected by the back coating and particular methods for constituting said coating, combined with said means.

My invention will be described in detail hereinafter, with reference to the accompanying drawings, traced without considering scale or proportions, in order to facilitate the statement. In said drawings—

Figure 7:
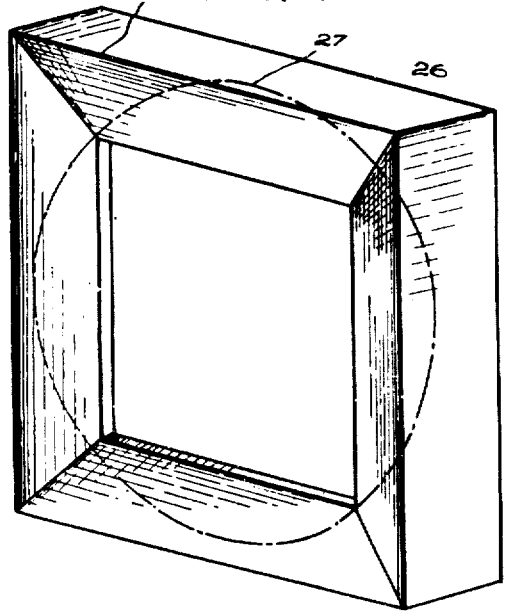
Figure 8:
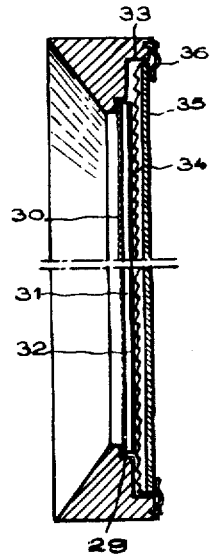

Fig. 1 shows in perspective a simple photograph, partly broken away, and which comprises a back coating obtained according to the principle protected by the above-mentioned patent, Fig. 2 is a sectional view on an enlarged scale of a simple photograph of the type of that shown in Fig. 1, Figs. 3, 4 and 5 illustrate other modifications of the back coating forming reflection intensifier, Fig. 6 is the diagram of an adapter frame allowing to vary the setting of the reflection-intensifying coatings in accordance with the invention, Fig. 7 is a perspective view of said adapter frame, Fig. 8 is a cross section thereof.

In the following, for greater simplicity, the reflecting and eventually diffusing back coating, forming reflection intensifier, obtained according to the invention, will be called the back of the photograph.

The simple photograph illustrated in Fig. 1, comprises the image-layer 1 carried by the front transparent support 2, constituted for instance by a glass plate, but which can also eventually be formed by a sheet or film of suitable transparent synthetic material. The back 3 of said photograph applied against the image-layer 1 is, according to the invention, constituted by a reflecting device, of the type of that described in the afore-mentioned patent. It has, as shown in the figure, a multitude of parallel flutes, of general triangular cross section, giving rise to narrow reflecting surfaces. The width of said surface is of the order of 1/10 of a millimeter, so that they are invisible at the normal distance at which the image is observed. The choice of the width of the flutes can vary between certain limits, and depends, in the first place, on the size of the image.

As it has been specified in said prior patent, the parallel reflecting surfaces 3 are disposed in a direction variable according to the conditions of utilisation, relatively to the edges of the image. They are disposed, in each case, so that the ridges thereof are perpendicular to the main direction of the luminous rays striking the photograph, so as to ensure the maximum reflection of said rays and, consequently, to intensify to the maximum the luminosity of the image, the place occupied by the luminous source being taken into account.

In accordance with an essential feature of the present invention, the reflecting back constitutes, in every case, an independent element, movable relatively to the image proper, in order to allow of easily setting its flutes.

In Fig. 2 which exactly corresponds to Fig. 1, 1 designates the image-layer, and 2 the transparent support of the latter. The back provided according to the invention is designated by 3. This figure shows how the invention allows of remedying the above-mentioned inconvenience of simple photographs having a plane metallized surface parallel to the surface of the image-layer, said inconvenience consisting in troublesome interfering reflections on the dark portions of said image.

The path of luminous ray $C^1$ shows that the latter, refracted at 13, if it encounters at 14 a dense portion of the image according to a deep-dark portion, cannot pass through the image-layer 1, but will be partly absorbed at this point, and partly reflected, to emerge at 15, and issue according to a direction greatly deviating from the perpendicular to the plane of the image. Said perpendicular normally represents the direction according to which the image is observed, and it is indeed according to said perpendicular that the ray $C^2$, for instance, which has encountered a transparent portion of the image-layer, has precisely been reflected by the facet 11 of the back. This selection phenomenon owing to which the light portions of the image allow the luminous rays to be intensely reflected, whereas the latter are stopped by the dark portions, imparts to the photographs comprising the back according to the invention a particularly rich scale of values ranging from brilliant white to very dark black.

The following figures show that the back coating 3 forming reflection intensifier can be practically obtained in various ways, which all remain included in the scope of the invention.

It is essentially composed in any case, by a fluted homogeneous or composite sheet, made of a material possessing naturally or owing to a suitable preparation, reflecting properties.

The back shown in Figs. 1 and 2 is constituted by an engraved metal sheet, for instance a copper sheet, nickelled or chromium-plated after engraving, for preserving its brilliancy.

Fig. 3 shows a back similar to that illustrated in Fig. 2, but made of any thermoplastic material moulded and coated at the surface thereof with a reflecting deposit 21, for instance a metallized layer obtained by projection, or by galvanoplasty.

In the example of Fig. 4, the flues are formed in a thin metal sheet 22, for instance a sheet of goffered foil; and eventually nickelled or chromium-plated.

Fig. 5 illustrates a reflecting back similar to that of Fig. 4, but in which the goffered metal sheet 22 is supported by a rear layer of reinforcing material 23, either poured into the flutes as a liquid, for instance in the hot state, or moulded to the form of the flutes and in which the foil 22 will subsequently be secured by means of a suitable adhesive. The moulding during the same operation, of the metal sheet 22 and the thermoplastic reinforcing layer can also be contemplated. The unit 22—23 can also be moulded after securing thereof on a rigid and plane support, such as the glass plate 20 of Fig. 3.

Owing to the very reduced dimensions of the flutes of back 3, it is not indispensable that the reinforcing layer 23 should exactly conform to the rear profile of the metal sheet 22. The case can even be contemplated in which said reinforcing layer 23 is plane and secured to the back at its edges only, for instance by means of a suitable bordering.

It is to be understood that the features of the various embodiments can be applied, either separately, or in combination, allowing to obtain intermediate embodiments, all included in the scope of the invention.

According to another feature of the invention, and for reasons set forth in the above-mentioned patent, referred to at the beginning of the present specification, the brilliant surfaces of the flutes can be rendered slightly diffusing. For that purpose, the engraved metal surface can be for instance slightly dulled, either by subjecting it to the action of acid, eventually before the nickelling or chromium-plating thereof, or by forming thereon a light galvanoplastic deposit. If a moulded thermoplastic material is under consideration, the degree of dulling necessary will be obtained by suitably attacking the surface of the moulds serving for the manufacture. In the case of a goffered metal sheet, the latter will be for instance subjected, before or after the goffering operation, to a suitable action with acid.

The cutting and partial dulling of the reflecting surfaces of the back can also be effected simultaneously, by dulling the cutting edge of the tool utilized for the engraving. The same process can be also applied to the engraving of the moulds intended to be used for manufacturing the fluted backs made of a thermoplastic material.

In the case in which, as illustrated in Fig. 3, the surfaces of the flutes receive a metal deposit, certain metallization processes by atomisation can directly impart to the reflecting surface thus obtained the required diffusing properties.

When the back according to the invention is applied to the peri-stereoscopic picture, in which the lined images are covered by a selective grating having cylindrical lenticular elements (Selectoscope), it is necessary, when choosing the inclination to be given to the flutes, to also take into account the phenomenon of formation of "moires," capable of being caused between the flutes of the back 1, the image-lines and the cylindrical lenticular elements of the Selectoscope. Any risk of the appearance of moires can be practically eliminated by setting the flutes according to an angle of 30° at least relatively to the direction of the image-lines and lenticular elements, that is to say relatively to the vertical. On the other hand, the more the width of the flutes differs from that of the lenticular elements, the slighter will be the risk of causing the appearance of moires.

It must moreover be mentioned, concerning the application of the invention to peri-stereoscopic images, that the phenomenon of concentrating a diffused light (window, chandelier, etc.) at the focus of each of the lenticular elements of the Selectoscope, before said light is reflected by the facets of the flutes of the coating according to the invention, amplifies to a surprising degree the reflection effect due to said coating, which renders this particular application especially advantageous.

As specified in the afore-mentioned patent and recalled above, the flutes must be set at right angles to the main direction according to which the light is admitted, for ensuring the maximum reflection towards the observer placed in front of the image. More exactly, the ridges thereof must be set in this manner.

The invention also relates to an adapter frame device allowing of ensuring, on the spot, the best possible rendering of each photograph, by the easy setting of the flutes of the reflecting back which completes it.

The diagram of said device is shown in Fig. 6, in which the rectangular format of the photograph proper, either a simple photograph or a peri-stereoscopic picture, is designated at 26. The corresponding reflecting back is, in this case, and according to my invention, of circular shape, as shown at 27, the minimum diameter thereof being equal to the diagonal of the image rectangle 26. The outer dimension of the frame is at least equal to the rectangle 28, similar to rectangle 26, and in which the circle 27 is inscribed.

Fig. 7 illustrates such a frame seen in perspective and Fig. 8 is a cross section of the latter. In the first groove 29 of said frame, corresponding to rectangle 26, is placed the photograph proper, constituted in the example chosen by the Selectoscope 30, the support 31 thereof and the image-layer 32 containing the lined image. The depth of the groove 29 is slightly less than the thickness of the unit 30—32. In a second groove 33, corresponding to circle 27, or of square shape having a side equal to the diameter of said circle, is placed the reflecting back 34, of circular shape, which closely presses against the image-layer. The whole structure being placed in its final location, the best inclination to be given to the flutes can then be experimentally found by rotating the back 34 in the groove until the photograph is visible in the most favourable conditions. The back 34 is then held stationary in a suitable position and clamped against the photograph by a suitable device, for instance by a rectangular panel 35 held in position by spring stops 36.

The assemblage of these two elements will be effected by means of a suitable bordering, for instance an adhesive strip, or also by means of a narrow frame of thermoplastic material eventually obtained by immersing the edges of the photograph in a bath of cellulose material or synthetic resin.

In the foregoing, only triangular flutes having plane surfaces and sharp angles have been contemplated. However, this preferred form must not be considered in a limiting sense. It is thus that, the reflecting surfaces 11 proper can be given, for instance, a slightly curved shape, either convex, or concave, this causing a certain effect of dispersion to the reflected rays. For manufacturing reasons the ridges of the flutes might be slightly rounded.

It is to be understood that the invention is applicable to all kinds of photographs, and among others to polychromatic photographs. The utilisation of the back reflection intensifying coating according to the invention will also ensure an appreciable improvement in colour photographs having multiple chromogeneous layers, owing to the brilliancy which it is thus possible to give to their colours.

The images of any nature, obtained on a transparent support, the origin of which may be or not photographic, remain of course included in the scope of the invention, as soon as they are provided with the dorsal coating forming reflection intensifier described and illustrated.

Having now particularly described and ascertained the nature of my said invention, and in what manner the same is to be performed, I declare that what I claim is:

1. A photographic picture comprising a frame, a transparent plate relatively fixedly secured within said frame, a light-transmitting image carrying layer secured on said plate, said frame being provided with a bearing shoulder rearwardly of said plate, a substantially circular reflection-intensifying element rotatably received within the recess defined by said bearing shoulder for angular adjustment about its central axis, said element having a series of parallel rectilinear fluted projections arranged to reflect incident illumination through said image carrying layer, and means for securing said element in its angularly adjusted position.

2. A photographic picture comprising a frame, a selective grating having cylindrical lenticular elements and a smooth rear face, a lined composite image layer carried by said rear face providing a light-transmitting image, said grating being fixedly secured within said frame, said frame being provided with a bearing shoulder rearwardly of said grating, a substantially circular reflection-intensifying element rotatably received within the recess defined by said bearing shoulder for angular adjustment about its central axis, said intensifying element having a series of parallel rectilinear fluted projections arranged to reflect incident illumination through said image layer, and means for securing said intensifying element in its angularly adjusted position.

MAURICE BONNET.

(References on following page)

REFERENCES CITED

The following references are of record in the file of this patent:

UNITED STATES PATENTS

| Number | Name | Date |
|---|---|---|
| 1,351,529 | Mauvillin et al. | Aug. 31, 1920 |
| 1,640,230 | Blau | Aug. 23, 1927 |
| 1,670,327 | Tobener | May 22, 1928 |
| 1,858,975 | Bois | May 18, 1932 |
| 2,023,442 | Woller | Dec. 10, 1935 |
| 2,036,146 | Kampfer | Mar. 31, 1936 |
| 2,149,171 | Grote | Feb. 28, 1939 |
| 2,181,926 | Tiger | Dec. 5, 1939 |
| 2,214,412 | Evans | Sept. 10, 1940 |

FOREIGN PATENTS

| Number | Country | Date |
|---|---|---|
| 356,501 | Great Britain | Sept. 10, 1931 |
| 410,517 | Great Britain | May 18, 1934 |
| 852,964 | France | Nov. 18, 1939 |